July 17, 1962 H. R. MATHWICH 3,045,185

REPEATER STATION HAVING DIVERSITY RECEPTION AND FULL HOT STANDBY MEANS

Filed May 19, 1958 2 Sheets-Sheet 1

INVENTOR.
HOWARD R. MATHWICH
BY D.A. Rechif
ATTORNEY

INVENTOR.
HOWARD R. MATHWICH
BY
ATTORNEY

1

3,045,185
REPEATER STATION HAVING DIVERSITY RECEPTION AND FULL HOT STANDBY MEANS
Howard R. Mathwich, Haddonfield, N.J., assignor to Radio Corporation of America, a corporation of Delaware
Filed May 19, 1958, Ser. No. 736,245
1 Claim. (Cl. 325—5)

This invention relates to a repeater station arrangement for communications, and more particularly to a repeater station useful in microwave relaying systems.

An object of this invention is to provide a novel repeater station arrangement which provides high system reliability.

Another object is to provide a repeater station arrangement which combines the advantages of diversity reception and full hot standby, with the addition of only a small amount of equipment as compared to an arrangement employing only diversity reception or only full hot standby.

The objects of this invention are accomplished, briefly, in the following manner: A transmitting station transmits the signal intelligence in frequency diversity fashion, that is, the same intelligence is transmitted on two different high frequencies or carrier frequencies. At the repeater station of the invention, separate receivers are utilized to reduce these respective frequency diversity signals to the intermediate frequency range. The two intermediate frequency signals are compared in strength by means of diversity switching units, and the stronger of the two signals is selected and applied, separately, to respective ones of two transmitters which have output frequencies differing from each other and which are arranged to transmit intelligence in a direction opposite to that from which it is received at the repeater station. Thus, the stronger of the two frequency diversity signals received is amplified and transmitted in frequency diversity fashion to the next succeeding repeater station. The receivers and transmitters described are entirely separate, electrically, having their own local oscillators, power supplies, etc. Preferably, a two-way repeater station is utilized, so that at the repeater station there are provided duplicates of the receivers and transmitters previously described, which operate similarly but in the reverse direction, that is, so that the intelligence is transmitted through the repeater station in the opposite direction. Full frequency diversity thus is in effect at the repeater station, in both directions. If any component of either of the receivers fails, the diversity switching units automaticallyy select the signal from the other receiver, so that output is still maintained on two transmitters, while if an entire one of the duplicated two-way equipment fails, the other continues to function; therefore, full hot standby is also in effect at the repeater station.

Figure 1:
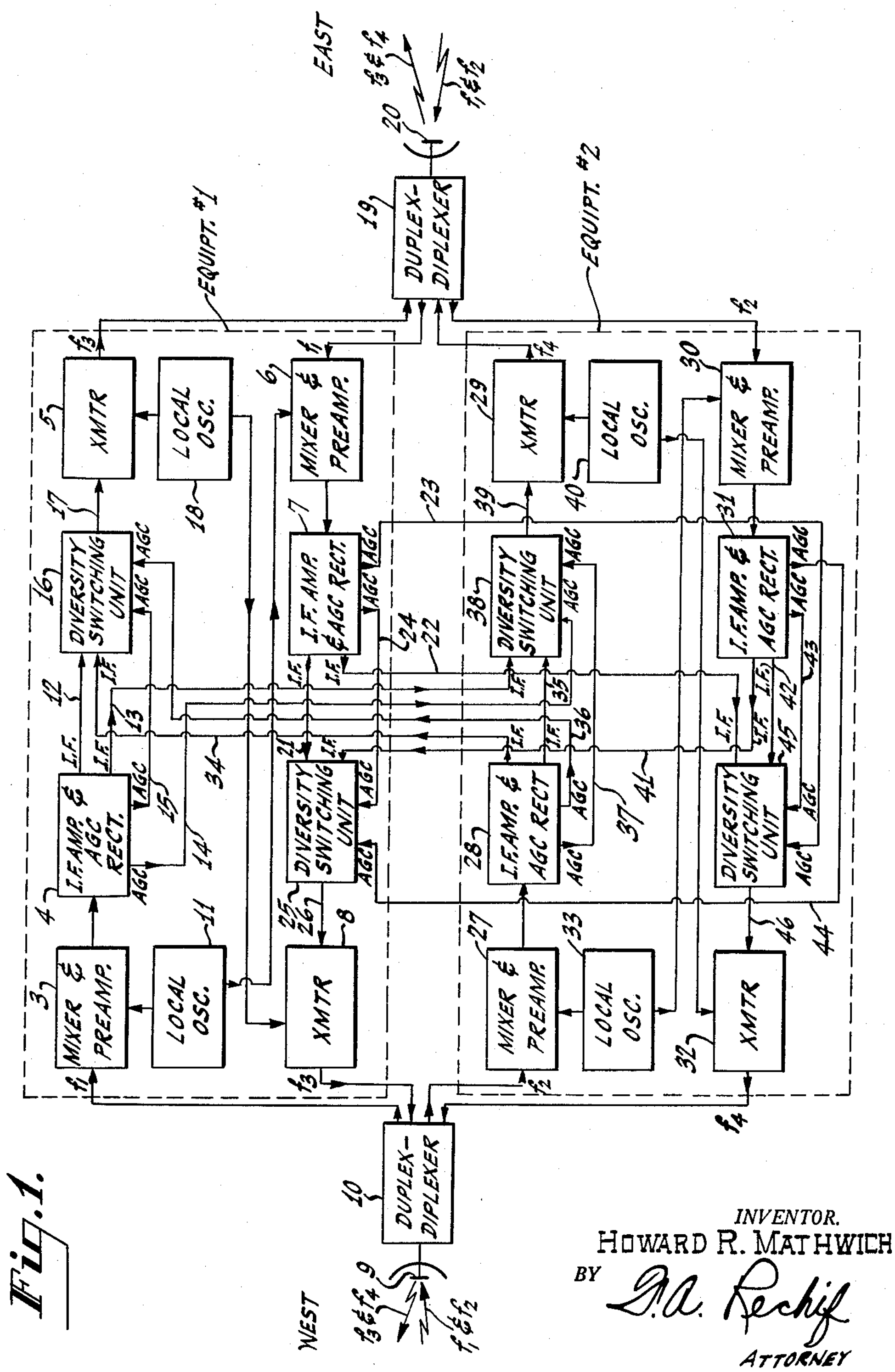
Figure 2:
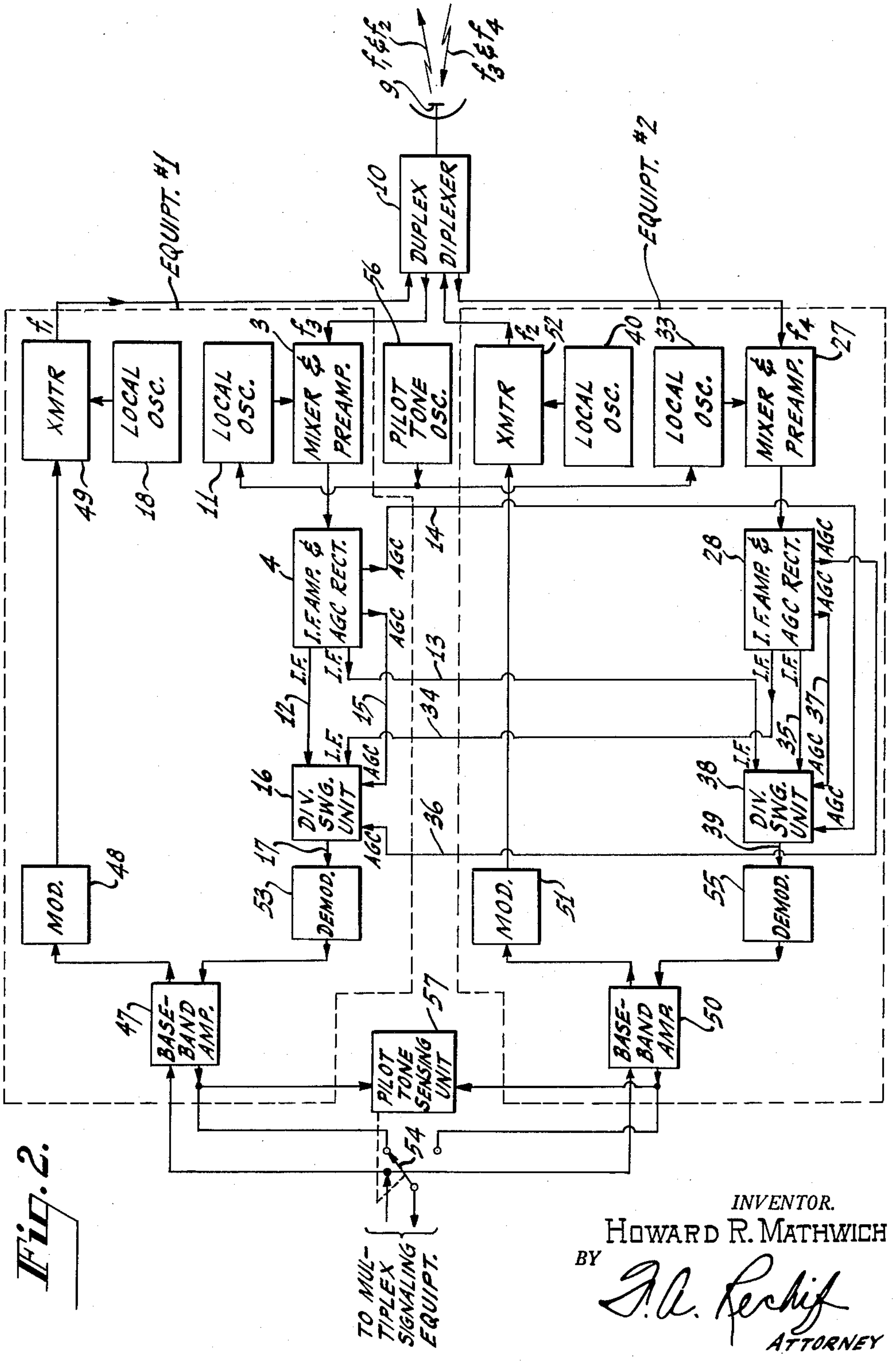

A detailed description of the invention follows, taken in conjunction with the accompanying drawings, wherein:

FIG. 1 is a block diagram of a repeater station arrangement according to the present invention; and FIG. 2 is a block diagram of a terminal station arrangement which is analogous to the repeater station of FIG. 1.

FIG. 1 illustrates a two-way repeater station utilizing the principles of this invention. The repeater station is a heterodyne type repeater. Generally speaking, Equipment No. 1 (enclosed in dotted lines) is a two-way repeating assembly of equipment comprising a West-East mixer and preamplifier 3, an intermediate frequency amplifier 4, and a transmitter 5, and a separate East-West mixer and preamplifier 6, an intermediate frequency amplifier 7, and a transmitter 8. This equipment operates on two radio frequency (or microwave) frequencies $f_1$ and $f_3$, the West-East signal being received on frequency $f_1$ and retransmitted on frequency $f_3$, and the East-West signal being received on frequency $f_1$ and retransmitted on frequency $f_3$.

2

More in detail, a signal pickup and transmission device, such as a West receiving and transmitting antenna 9, picks up a signal radiated on frequency $f_1$ from a remote transmitting station spaced to the West of the repeater station illustrated. Since four different signals, of as many frequencies, are acted on by antenna 9, a duplex-diplexer 10 is coupled to antenna 9. Antenna 9 receives signals at frequencies $f_1$ and $f_2$ and transmits signals at frequencies $f_3$ and $f_4$. Unit 10 serves as the coupling between the circuitry at the repeater station and the antenna 9, and prevents interaction between the various waves. The signal of frequency $f_1$ picked up by antenna 9 appears at one of the outputs of duplex-diplexer 10, and thence is fed to one input of the mixer and preamplifier 3. A local oscillator 11 supplies heterodyning energy to another input of mixer 3, thereby to convert the incoming energy of frequency $f_1$ to the intermediate frequency range, a typical intermediate frequency being 70 mc.

The intermediate frequency signal, after being amplified in unit 3, is fed from the output of this unit to the input of an intermediate frequency amplifier 4 which has two signal output connections 12 and 13. Amplified intermediate frequency energy appears at both of the connections 12 and 13. The unit 4 also includes an automatic gain control (AGC) rectifier, which operates to develop a unidirectional potential (AGC potential) proportional to the signal strength in the intermediate frequency amplifier. This potential proportional to the signal strentgh appears at the two "AGC" output connections 14 and 15. The intermediate frequency signal output connection 12 is coupled to a signal input of a diversity switching unit 16. The AGC connection 15 is coupled to an AGC input of switching unit 16. Unit 16 operates to compare (by means of the corresponding AGC potentials) the strengths of two intermediate frequency signals fed thereto, and to select the stronger of the two signals, the stronger signal then being switched to the common output connection 17 of unit 16. Assume for the moment that unit 16 has selected the intermediate frequency output of unit 4 (fed to unit 16 by means of connection 12), so that the description may be completed. The intermediate frequency signal out of unit 16 is fed by means of connection 17 to the input of transmitter 5, which includes a high frequency mixer. Heterodyning energy is fed from a local oscillator 18 to transmitter 5, to heterodyne the amplified intermediate frequency signal (amplified in unit 4) up to a frequency $f_3$ for transmission from the repeater station of the invention.

The output of transmitter 5, at frequency $f_3$, is fed as one input to a duplex-diplexer 19, which may be similar in construction to unit 10. This wave at frequency $f_3$ is fed from duplex-diplexer 19 to the East receiving and transmitting antenna 20, for transmission from the repeater station of FIG. 1 to a remote receiving station spaced to the East of the repeater station illustrated. The terms "West" and "East" are used merely by way of example, the repeater station of the invention operating to pick up signals from any direction and retransmit them in another (or opposite) direction.

The East-West subassembly of Equipment No. 1 operates quite like the West-East subassembly just described. The East antenna 20 picks up a signal radiated on frequency $f_1$ from a remote transmitter spaced to the East of the repeater station of FIG. 1. The signal of frequency $f_1$ picked up by antenna 20 is fed from one of the outputs of duplex-diplexer 19 to one input of the mixer and preamplifier 6. The local oscillator 11 also supplies heterodyning energy to mixer 6, and the resultant intermediate frequency signal, after being amplified in unit 6, is fed to the input of intermediate frequency amplifier 7. This latter unit is very similar to unit 4, having two signal output connections 21 and 22 and two AGC output connections 23 and 24. The intermediate frequency signal output connection 21 is coupled to a signal input of a diversity switching unit 25 which is very similar to unit 16, and operates in a similar manner. The AGC connection 24 is coupled to an AGC input of switching unit 25.

Assuming that unit 25 has selected the intermediate frequency output of unit 7, the intermediate frequency signal out of unit 25 is fed by means of its output connection 26 to the input of transmitter 8, which includes (like transmitter 5, previously described) a high frequency mixer. Heterodyning energy is fed from oscillator 18 to transmitter 8, to heterodyne the amplified intermediate frequency signal (amplified in unit 7) up to frequency $f_3$ for transmission. The output of transmitter 8, at frequency $f_3$, is fed through duplex-diplexer 10 to the West antenna 9 for transmission. The signal at frequency $f_3$ is transmitted to a remote receiving station spaced to the West of the repeater station illustrated.

Equipment No. 2 (enclosed in dotted lines) is also located at the repeater station of the invention. This latter equipment is a two-way repeating assembly comprising a West-East mixer and preamplifier 27, an intermediate frequency amplifier 28, and a transmitter 29, and a separate East-West mixer and preamplifier 30, an intermediate frequency amplifier 31, and a transmitter 32. Equipment No. 2 operates on two radio frequencies $f_2$ and $f_4$, the West-East signal being received on frequency $f_2$ and retransmitted on frequency $f_4$, and the East-West signal being received on frequency $f_2$ and retransmitted on frequency $f_4$.

The West antenna 9 picks up a signal radiated on frequency $f_2$ from a remote transmitter West of the repeater station. The signal of frequency $f_2$ picked up by antenna 9 is fed from one of the outputs of duplex-diplexer 10 to one input of the mixer and preamplifier 27. A local oscillator 33 supplies heterodyning energy to mixer 27, and the resultant intermediate frequency signal, after being amplified in unit 27, is fed to the input of intermediate frequency amplifier 28. This latter unit is very similar to units 4 and 7, having two signal output connections 34 and 35 and two AGC output connections 36 and 37. The AGC connection 37 is coupled to an AGC input of a diversity switching unit 38 which is very similar to units 16 and 25, and operates in a similar manner. The intermediate frequency signal output connection 35 is coupled to a signal input of switching unit 38.

Assuming that unit 38 has selected the intermediate frequency output of unit 28, the intermediate frequency signal out of unit 38 is fed by means of its output connection 39 to the input of transmitter 29, which includes a high frequency mixer. Heterodyning energy is fed from a local oscillator 40 to transmitter 29, to heterodyne the amplified intermediate frequency signal (amplified in unit 28) up to frequency $f_4$ for transmission. The output of transmitter 29, at frequency $f_4$, is fed through duplex-diplexer 19 to the East antenna 20 for transmission. The signal at frequency $f_4$ is transmitted to a remote receiver spaced to the East of the repeater station illustrated.

The East-West subassembly of Equipment No. 2 operates quite like the West-East subassembly just described. The East antenna 20 picks up a signal radiated on frequency $f_2$ from a remote transmitter spaced to the East of the repeater station of FIG. 1. The signal of frequency $f_2$ picked up by antenna 20 is fed from one of the outputs of unit 19 to one input of the mixer and preamplifier 30. The local oscillator 33 also supplies heterodyning energy to mixer 30, and the resultant intermediate frequency signal, after being amplified in unit 30, is fed to the input of intermediate frequency amplifier 31. This latter unit is very similar to units 4, 7, and 28, having two signal output connections 41 and 42 and two AGC output connections 43 and 44. The intermediate frequency signal output connection 42 is coupled to a signal input of a diversity switching unit 45 which is very similar to units 16, 25, and 38, and operates in a similar manner. The AGC connection 43 is coupled to an AGC input of switching unit 45.

Assuming that unit 45 has selected the intermediate frequency output of unit 31, the intermediate frequency signal out of unit 45 is fed by means of its output connection 46 to the input of transmitter 32, which includes a high frequency mixer. Heterodyning energy is fed from oscillator 40 to transmitter 32, to heterodyne the amplified intermediate frequency signal (amplified in unit 31) up to frequency $f_4$ for transmission. The output of transmitter 32, at frequency $f_4$, is fed through duplex-diplexer 10 to the West antenna 9 for transmission. The signal at frequency $f_4$ is transmitted to a remote receiver spaced to the West of the repeater station illustrated.

Equipments No. 1 and No. 2 are completely independent, and are electrically separate from each other, having their own individual local oscillators (oscillators 11 and 18 for No. 1 and oscillators 33 and 40 for No. 2) and power supplies.

The local oscillators 11 and 33 have such frequencies that, taking into account the values of frequencies $f_1$ and $f_2$, the intermediate frequencies produced for the various amplifiers 4, 7, 28, and 31 are all of the same frequency. As an example, this frequency may be 70 mc.

The diversity switching unit 16 receives an intermediate frequency signal from amplifier 4 by way of connection 12, and also receives an intermediate frequency signal from amplifier 28, by way of connection 34. The AGC output connection 36 of amplifier 28 is coupled to an AGC input of unit 16. Thus, unit 16 receives intermediate frequency signals from the West-East intermediate frequency amplifier 4 in Equipment No. 1 and the West-East intermediate frequency amplifier 28 in Equipment No. 2. This diversity unit 16 operates to compare the two AGC potentials fed thereto, which potentials are proportional respectively to the signal strengths in amplifiers 4 and 28, and to switch that intermediate frequency signal (from amplifier 4 or from amplifier 28) corresponding to the stronger AGC potential, to the output connection 17 of unit 16. Thus, the stronger of the two West-East intermediate frequency signals is selected for use in transmitter 5. If either intermediate frequency signal fails for any reason, the other signal is selected for use in transmitter 5. This protects the West-East reception. Since the signal in amplifier 4 is received on frequency $f_1$ and the signal in amplifier 28 is received on frequency $f_2$, frequency diversity reception is utilized here, in the West-East direction.

The diversity switching unit 25 receives an intermediate frequency signal from amplifier 7 by way of connection 21, and also receives an intermediate frequency signal from amplifier 31, by way of connection 41. The AGC output connection 44 of amplifier 31 is coupled to an AGC input of unit 25. Thus, unit 25 receives intermediate frequency signals from the East-West intermediate frequency amplifier 7 in Equipment No. 1 and the East-West intermediate frequency amplifier 31 in Equipment No. 2. Diversity unit 25 operates to compare the two AGC potentials fed thereto, which potentials are proportional respectively to the signal strengths in amplifiers 7 and 31, and to switch that intermediate frequency signal (from amplifier 7 or from amplifier 31) corresponding to the stronger AGC potential, to the output connection 26 of unit 25. Thus, the stronger of the two East-West intermediate frequency signals is selected for use in transmitter 8. If either intermediate frequency signal fails for any reason, the other signal is selected for use in transmitter 8. This protects the East-West reception. Since the signal in amplifier 7 is received on frequency $f_1$ and the signal in amplifier 31 is received on frequency $f_2$, frequency diversity reception is utilized here, in the East-West direction.

The diversity switching unit 38 receives an intermediate frequency signal from amplifier 28 by way of connection 35, and also receives an intermediate frequency signal from amplifier 4, by way of connection 13. The AGC output connection 14 of amplifier 4 is coupled to an AGC input of unit 38. Unit 38 thus receives signals from the West-East intermediate frequency amplifier 4 in Equipment No. 1 and the West-East intermediate frequency amplifier 28 in Equipment No. 2. Diversity unit 38 operates to compare the two AGC potentials fed thereto, which potentials are proportional respectively to the signal strengths in amplifiers 4 and 28, and to switch that intermediate frequency signal (from amplifier 4 or from amplifier 28) corresponding to the stronger AGC potential, to the output connection 39 of unit 38. Thus, the stronger of the two West-East intermediate frequency signals is selected for use in transmitter 29.

The diversity switching units 16 and 38 are similar to each other. Therefore, if the West-East signal in amplifier 4 (received on frequency $f_1$) is stronger than the West-East signal in amplifier 28 (received on frequency $f_2$), the former is selected by both units 16 and 38 and fed to both transmitters 5 and 29, for transmission on frequencies $f_3$ and $f_4$, respectively. If the West-East signal in amplifier 28 (received on frequency $f_2$) is stronger than the West-East signal in amplifier 4 (received on frequency $f_1$), the former is selected by both units 16 and 38 and fed to both transmitters 5 and 29, for transmission on frequencies $f_3$ and $f_4$, respectively. Thus, the stronger of the two West-East signals received in frequency diversity at the repeater station is transmitted to the East in frequency diversity from such repeater station.

The diversity switching unit 45 receives an intermediate frequency signal from amplifier 31 by way of connection 42, and also receives an intermediate frequency signal from amplifier 7, by way of connection 22. The AGC output connection 23 of amplifier 7 is coupled to an AGC input of unit 45. Unit 45 thus receives signals from the East-West intermediate frequency amplifier 7 in Equipment No. 1 and the East-West intermediate frequency amplifier 31 in Equipment No. 2. Diversity unit 45 operates to compare the two AGC potentials fed thereto, which potentials are proportional respectively to the signal strengths in amplifiers 7 and 31, and to switch that intermediate frequency signal (from amplifier 7 or from amplifier 31) corresponding to the stronger AGC potential, to the output connection 46 of unit 45. Thus, the stronger of the two East-West intermediate frequency signals is selected for use in transmitter 32.

The diversity switching units 25 and 45 are similar to each other. Therefore, if the East-West signal in amplifier 7 (received on frequency $f_1$) is stronger than the East-West signal in amplifier 31 (received on frequency $f_2$), the former is selected by both units 25 and 45 and fed to both transmitters 8 and 32, for transmission on frequencies $f_3$ and $f_4$, respectively. If the East-West signal in amplifier 31 (received on frequency $f_2$) is stronger than the East-West signal in amplifier 7 (received on frequency $f_1$), the former is selected by both units 25 and 45 and fed to both transmitters 8 and 32, for transmission on frequencies $f_3$ and $f_4$, respectively. Thus, the stronger of the two East-West signals received in frequency diversity at the repeater station is transmitted to the West in frequency diversity from such repeater station.

From the above, it may be seen that full frequency diversity (that is, both frequency diversity reception and frequency diversity transmission) is operating at the repeater station of FIG. 1, in both the West-East and East-West directions.

Consider now what occurs when the equipment fails. As mentioned previously, Equipments No. 1 and No. 2 are completely independent and electrically separate, having their own individual local oscillators and power supplies. If, for example, any preamplifier and mixer unit, or any intermediate frequency amplifier, fails, exactly the same action takes place as previously described, with output still being maintained on two transmitters per direction. For example, assume that intermediate frequency amplifier 4 fails, so that the intermediate frequency signal at output connections 12 and 13 drops to zero, and also the AGC potential at connections 14 and 15 drops to zero. Then, diversity switching units 16 and 38 both select, for application to transmitters 5 and 29, respectively, the intermediate frequency signal out of amplifier 28. Frequency diversity transmission is still maintained. In any of the preamplifier and mixer units, or any intermediate frequency amplifier, fails, resulting in a loss of signal at the output of any one of the intermediate frequency amplifiers, the diversity switching units switch to the other signal (which is still present), and output is maintained on two transmitters per direction.

If any transmitter fails, the succeeding repeater station (or terminal station) interprets this the same as signal failure for any other reason, and switches to the "unfailed" incoming signal by means of its diversity units facing in that direction. For example, assume that a transmitter corresponding to transmitter 8, but located at the station just to the East of the repeater station of FIG. 1, has failed. Then, one of the signals (either frequency $f_1$ or frequency $f_2$) picked up by antenna 20 will no longer be present. The diversity switching units 25 and 45 then select the particular incoming signal that is still present, for application to the respective transmitters 8 and 32.

If an entire equipment (Equipment No. 1 or Equipment No. 2) fails, the other continues to function, thus preserving the continuity through the repeater station. For example, if Equipment No. 2 fails, units 3, 4, 16, and 5 continue to function and maintain West-East continuity, while units 6, 7, 25, and 8 continue to function and maintain East-West continuity. In this case, the failure of Equipment No. 2 causes diversity switching units 16 and 25 to automatically select, for application to the respective transmitters 5 and 8, the intermediate frequency signal outputs of amplifiers 4 and 7, respectively.

Therefore, full hot standby is operating at the repeater station of FIG. 1, in addition to the full frequency diversity described above.

The operation of the assembly of FIG. 1 will now be compared, with regard to the amount of radio equipment required, to systems employing only frequency diversity, and to systems employing only full hot standby. In the case of systems employing only frequency diversity, there are required, per direction, at a repeater station, two sets of receiving equipment plus two sets of transmitting equipment and one diversity switching unit. Therefore, with the addition of only one diversity unit per direction, there is obtained, according to this invention, the added feature of full hot standby. In the case of systems employing only full hot standby, the same amount of equipment per repeater as that in FIG. 1 would be required, with the exception of the four diversity switching units 16, 25, 38, and 45 (per two-way repeater). Thus, the addition of these four relatively inexpensive units adds the frequency diversity feature to an assembly previously possessing only the hot standby feature.

The repeater station arrangement described therefore combines the advantages of two very desirable operational characteristics, at only a very slight increase in repeater station cost. A radio relay system of high transmission reliability is provided by combining the advantages of full frequency diversity and full hot standby.

A so-called "drop repeater" station (one whereat intelligence may be added or taken off, or both) may be provided, with the addition of a small amount of additional equipment not shown in FIG. 1.

For the taking off of intelligence channels, a West-East demodulator feeding into a baseband amplifier may be provided, together with a manual switching arrangement for feeding the input of this demodulator from either the output of diversity switching unit 16 or the output of unit 38. An East-West demodulator feeding into the same baseband amplifier may be provided, together with a manual switching arrangement for feeding the input of this demodulator from either the output of diversity switching unit 25 or the output of unit 45.

For the reception of service channel information, the input of a service channel audio unit may be fed from the outputs of both the West-East and the East-West demodulators. For the transmission of service channel information, the output of the service channel audio unit may be fed to the modulating input connections of both of the local oscillators 18 and 40, which are associated with the various transmitters and which enable modulation of the various transmitters to be effected.

Fault information is transmitted from the repeater station by way of the service channel audio unit to the local oscillators 18 and 40.

For the addition of intelligence channels, the intelligence is fed through the baseband amplifier to modulating input connections of the local oscillators 18 and 40.

FIG. 2 illustrates a terminal station arrangement utilizing the principles of this invention. In this figure, elements the same as those of FIG. 1 are denoted by the same reference numerals. The terminal station transmits frequency diversity signals on frequencies $f_1$ and $f_2$, and receives frequency diversity signals on frequencies $f_3$ and $f_4$. Thus, the terminal station is adapted to receive signals transmitted from the repeater station of FIG. 1, and to transmit signals to be received by such repeater station.

In order to transmit signals in frequency diversity, signals derived from the multiplex signaling equipment for transmission are fed to a baseband amplifier 47 in Equipment No. 1 and thence to a modulator 48 coupled to a transmitter 49. Heterodyning energy is supplied from a local oscillator 18 to a transmitter 49, this transmitter including a high frequency mixer. In this way, the signal intelligence is amplified and modulated onto the transmitter 49, from where the same is transmitted at frequency $f_1$ through the duplex-diplexer 10, for transmission from antenna 9. Signals derived from the multiplex signaling equipment for transmission are likewise fed to a baseband amplifier 50 in Equipment No. 2 and thence to a modulator 51 coupled to a transmitter 52. Heterodyning energy is supplied from a local oscillator 40 to transmitter 52, this transmitter including a high frequency mixer. In this way, the signal intelligence is amplified and modulated onto the transmitter 52, from where the same is transmitted at frequency $f_2$ through the unit 10, from antenna 9.

A signal on frequency $f_3$ received on antenna 9 is fed from the output of duplex-diplexer 10 to one input of the mixer and preamplifier 3, which is supplied with heterodyning energy from the local oscillator 11. The intermediate frequency signal produced in unit 3 is fed to the input of intermediate frequency amplifier unit 4, which has signal output connections 12 and 13, and also AGC output connections 14 and 15. Output connections 12 and 15 are coupled to diversity switching unit 16, which has a common output connection 17.

A signal on frequency $f_4$ received on antenna 9 is fed from the output of duplex-diplexer 10 to one input of the mixer and preamplifier 27, which is supplied with heterodyning energy from the local oscillator 33. The intermediate frequency signal produced in unit 27 is fed to the input of intermediate frequency amplifier unit 28, which has signal output connections 34 and 35, and also AGC output connections 36 and 37. Output connections 35 and 37 are coupled to diversity switching unit 38, which has a common output connection 39.

Output connections 34 and 36 of amplifier 28 are coupled to diversity switching unit 16. Therefore, unit 16 compares the signal strengths in amplifiers 4 and 28, selects the stronger of these two signals, and switches the selected (stronger) signal to its output connection 17. Thus, frequency diversity reception is effected. The signal appearing on output connection 17 is demodulated in a demodulator 53, amplified in baseband amplifier 47, and (assuming that switch 54 is in the position illustrated) passed on to the multiplex signaling (receiving) equipment for utilization.

Output connections 13 and 14 of amplifier 4 are coupled to diversity switching unit 38. Therefore, unit 38 compares the signal strengths in amplifiers 4 and 28, selects the stronger of these two signals, and switches the selected (stronger) signal to its output connection 39. The signal appearing on output connection 39 is demodulated in demodulator 55, amplified in baseband amplifier 50, and (if switch 54 is in its other position) passed on to the multiplex signaling (receiving) equipment for utilization.

The use of two chains of mixer-preamplifier and intermediate frequency amplifier allows frequency diversity reception, as well as hot standby, in the manner previously explained in connection with FIG. 1.

The use of two diversity switching units 16 and 38 and two demodulators 53 and 55 provides standby, and protects against failures of the diversity switching units and demodulators. As previously described in connection with FIG. 1, any failure in the mixer and preamplifier units or in the intermediate frequency amplifier units is automatically protected against, by the action of the diversity switching units 16 and 38. However, failures in the diversity switching units or demodulators may cause the received signal to fail (if switch 54 is in the circuit from the "failed" unit), and this is desired to be protected against. To automatically do this, the following expedient may be resorted to. Local oscillators 11 and 33, like oscillators 18 and 40, may each be provided with a modulating signal input. A pilot tone oscillator 56 is coupled to the modulating signal inputs of both oscillators 11 and 33, to add a pilot tone to the signals in each of the amplifiers 4 and 28.

A pilot tone sensing unit 57 is fed from the outputs of both of the baseband amplifiers 47 and 50. Unit 57 detects or measures the presence or absence of pilot tone in the baseband amplifier outputs, and operates switch 54. If the pilot tone is absent from the output of either of these amplifiers (as could happen if one of the diversity switching units or demodulators failed, for example), unit 57 operates switch 54 in such a way as to provide output from the operating diversity unit-demodulator chain, to the multiplex signaling (receiving) equipment.

It may be seen that full frequency diversity (both in reception and transmission), as well as full hot standby, is operating in the terminal station of FIG. 2.

By the addition of certain units (not shown) to FIG. 2, service channel signaling and fault signaling may be provided. Incoming (received) service channel information may be fed from the demodulators 53 and 55 to a service channel audio unit, while outgoing service channel information may be fed from this last unit to the modulation signal inputs of local oscillators 18 and 40, for transmission. Fault information may be fed from the service channel audio unit to a suitable fault receiver.

What is claimed is:

In a repeater station for a communication system, a first equipment for two-way communication including a first receiver arranged to receive intelligence transmitted from a remote transmitting station spaced from said repeater station in one direction, a second receiver arranged to receive intelligence transmitted from a remote transmitting station spaced from said repeater station in a different direction, each of said receivers being arranged to produce a control signal indicative of the strength of the intelligence signal received thereby, a first transmitter arranged to transmit intelligence in said one direction and a second transmitter arranged to transmit intelligence in said different direction, a first switching unit responsive to the control signal produced by said first receiver for applying the output of said first receiver to the input of said second transmitter, a second switching unit responsive to the control signal produced by said second receiver for applying the output of said second receiver to the input of said first transmitter; a second equipment for two-way communication electrically separate from and capable of operation independent of the operation of said first equipment, said second equipment including a third receiver arranged to receive intelligence transmitted from a remote transmitting station spaced from said repeater station in said one direction, a fourth receiver arranged to receive intelligence transmitted from a remote transmitting station spaced from said repeater station in said different direction, a third transmitter arranged to transmit intelligence in said one direction and a fourth transmitter arranged to transmit intelligence in said different direction, the operation of said first and second receivers being entirely independent of the operation of said third and fourth receivers and the operation of said first and second transmitters being entirely independent of the operation of said third and fourth transmitters, each of said third and fourth receivers being arranged to produce a control signal indicative of the strength of the intelligence signal received thereby, a third switching unit responsive to the control signal produced by said third receiver for applying the output of said third receiver to the input of said fourth transmitter and a fourth switching unit responsive to the control signal produced by said fourth receiver for applying the output of said fourth receiver to the input of said third transmitter; means to apply the output signal of said third receiver along with the control signal produced thereby to said first switching unit, said first switching unit being responsive to the control signals produced by said first and third receivers to compare the strength of the intelligence signals in said first and third receivers and to apply only the stronger of the intelligence signals to said second transmitter, means to apply the output signal of said fourth receiver along with the control signal produced thereby to said second switching unit, said second switching unit being responsive to the control signals produced by said second and fourth receivers to compare the strength of the intelligence signals in said second and fourth receivers and to apply only the stronger of the intelligence signals to said first transmitter, means to apply the output signal of said first receiver along with the control signal produced thereby to said third switching unit, said third switching unit being responsive to the control signals produced by said first and third receivers to compare the strength of the intelligence signals in said first and third receivers and to apply only the stronger of the intelligence signals to said fourth transmitter, and means to apply the output signal of said second receiver along with the control signal produced thereby to said fourth switching unit, said fourth switching unit being responsive to the control signals produced by said second and fourth receivers to compare the strength of the intelligence signals in said second and fourth receivers and to apply the stronger of the intelligence signals to said third transmitter.

References Cited in the file of this patent

UNITED STATES PATENTS

| | | |
|---|---|---|
| 2,034,738 | Beverage | Mar. 24, 1936 |
| 2,282,092 | Van B. Roberts | May 5, 1942 |
| 2,514,367 | Bond et al. | July 11, 1950 |
| 2,610,292 | Bond et al. | Sept. 9, 1952 |
| 2,725,467 | Atwood | Nov. 29, 1955 |
| 2,892,930 | Magnuski et al. | June 30, 1959 |
| 2,898,455 | Hymas et al. | Aug. 4, 1959 |